United States Patent [19]
Hoffman et al.

[11] 3,904,817
[45] Sept. 9, 1975

[54] SERIAL SCAN CONVERTER

[75] Inventors: Harvey F. Hoffman, Fairfield; Glenn C. Waehner, Riverside, both of Conn.

[73] Assignee: United Aircraft Corporation, East Hartford, Conn.

[22] Filed: Feb. 1, 1974

[21] Appl. No.: 438,888

[52] U.S. Cl. ......... 178/6.8; 178/DIG. 24; 343/5 DP
[51] Int. Cl.[2] ......................................... H04N 5/02
[58] Field of Search ....... 178/DIG. 24, 6, 6.8, 7.5 R; 343/5 DP, 55 C

[56] References Cited
UNITED STATES PATENTS

| | | | |
|---|---|---|---|
| 3,765,018 | 10/1973 | Heard ............................. | 343/5 DP |
| 3,774,201 | 11/1973 | Collins ........................... | 343/5 DP |
| 3,784,737 | 1/1974 | Waehner ......................... | 178/6 |
| 3,792,194 | 2/1974 | Wood ............................ | 178/DIG. 24 |
| 3,810,174 | 5/1974 | Heard ........................... | 178/DIG. 24 |

*Primary Examiner*—Howard W. Britton
*Assistant Examiner*—Michael A. Masinick
*Attorney, Agent, or Firm*—M. P. Williams

[57] ABSTRACT

Utilization of a versatile scan-converted display which can operate with a variety of radar sweep signals or a variety of television raster sweep signals permits use of a purely serial main memory for refreshing the display at a rate much higher than radar data acquisition rates, thereby eliminating the need for an expensive random access memory in a multi-source, refreshed, unitary display. The disclosed sources which the scan-converted display will accommodate include air-to-air radar utilizing a depressed center PPI format, a high resolution ground mapping radar utilizing a skewed B-scan with caterpillar advance, a weapon television, the timing of which is controlled by the scan converter, and a landing television which controls the scan converter with its timing.

8 Claims, 8 Drawing Figures

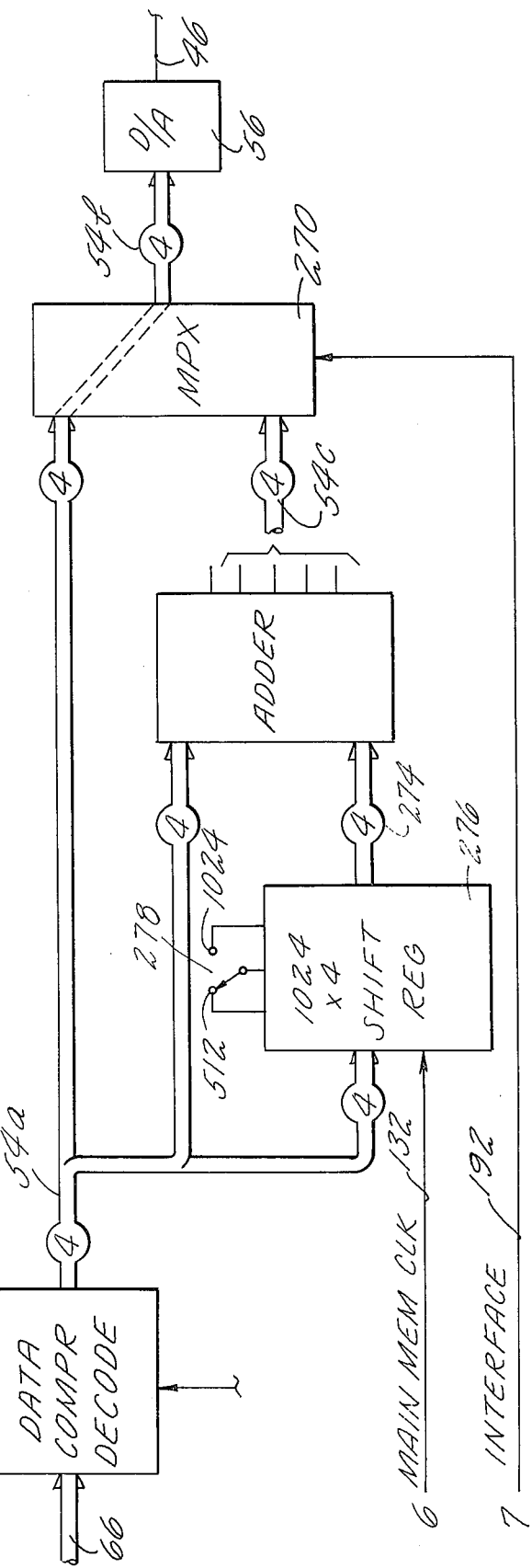

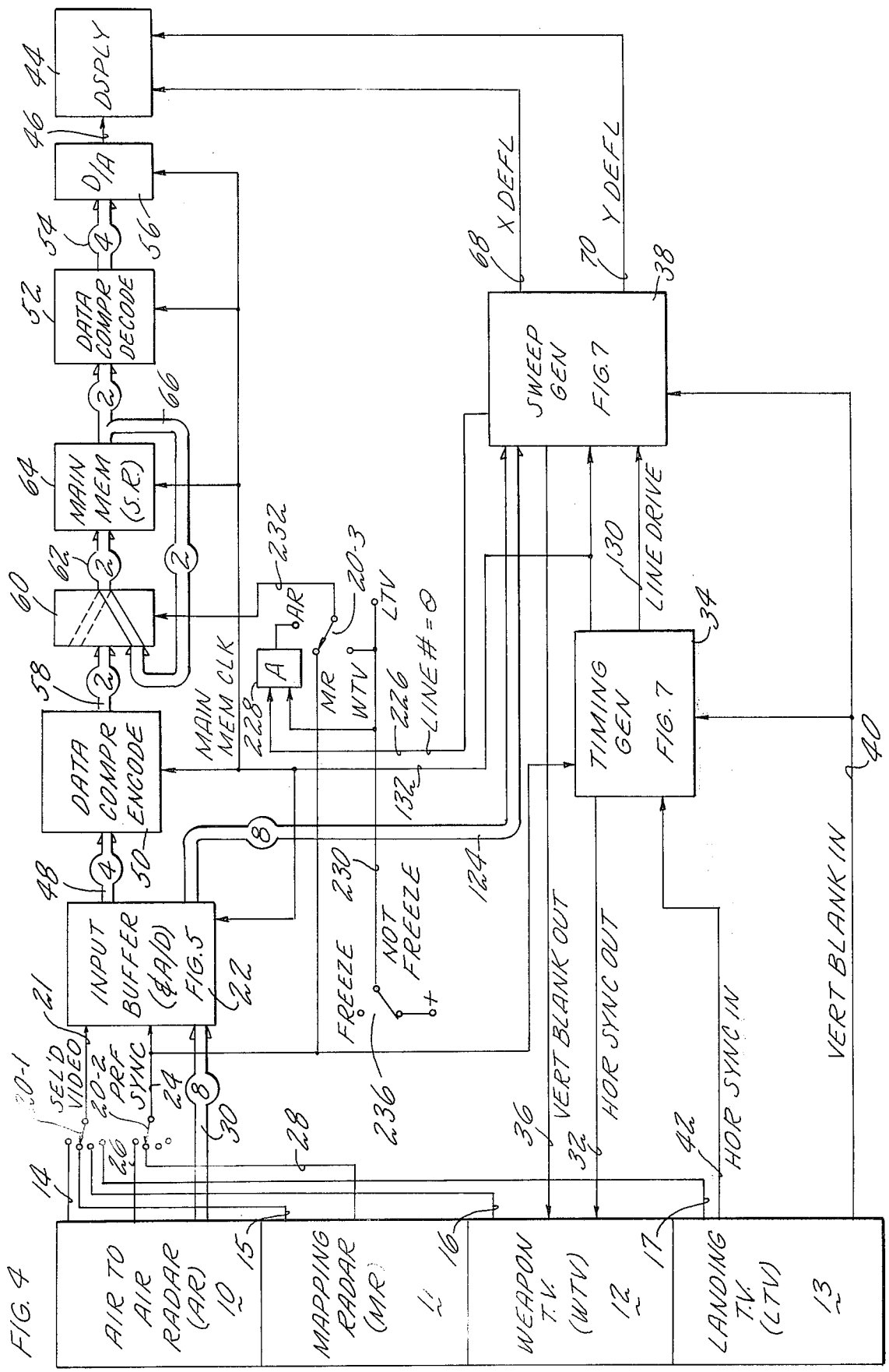

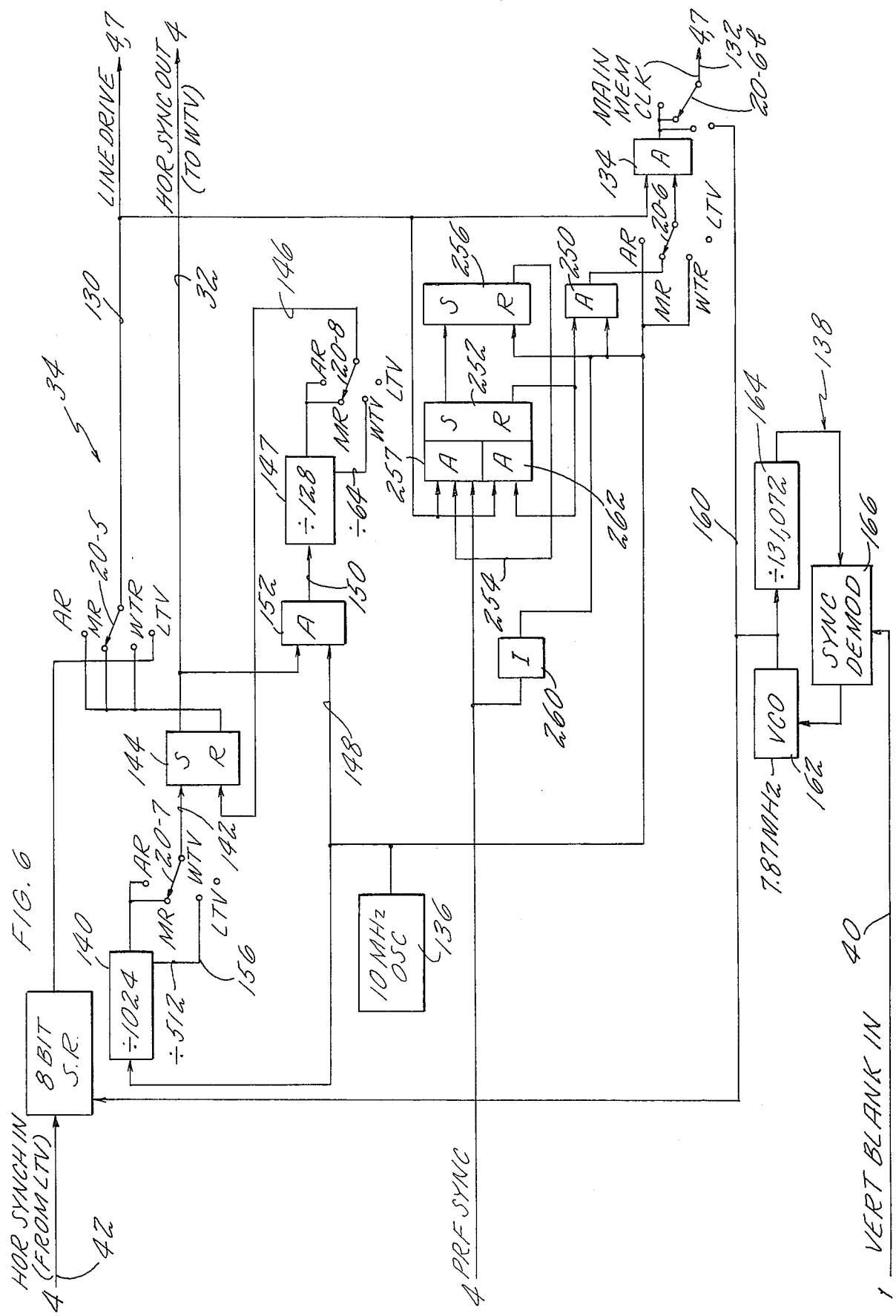

SERIAL SCAN CONVERTER

BACKGROUND OF THE INVENTION

1. Field of the Invention

This invention relates to data handling and displays, and more particularly to a purely serial scan converted multi-video-source display system.

2. Description of the Prior Art

Scan converters are typically utilized in cases where video sources of different types are to be viewed on a single display. For instance, it is common to alternatively display a radar and a weapon TV on the same display. Heretofore, the video format of one of the video sources is altered so as to be displayable in the format of the other of the video sources; because of the good resolution and appearance of a TV display, it has been common to convert radar video to TV raster format for display in multiple video source applications. Since this necessarily requires a large amount of storage, it has also been common to utilize the stored signals to refresh the display at a rate which is more frequent than the acquisition of video from the radar, thereby permitting utilization of cathode ray tubes which are selected for intensity or resolution rather than for persistence of the display.

Such systems have required the use of random access memories since the order in which the data is inserted into memory from the radar source is different than the order in which it is extracted from the memory for the TV display. In addition, having the displayed video in a format different than received video prohibits, or significantly limits the advantage of, the use of data compression. Thus, scan converters known to the art are typically very expensive, large, and cumbersome, and are therefore practical only in limited situations.

SUMMARY OF THE INVENTION

The principal object of the present invention is to provide an improved video scan converter, employing time conversion but not data format conversion.

Another object of the present invention is to provide a video scan converter which does not require the use of a random access memory.

A further object of the present invention is to provide a video scan converter which permits advantageous usage of data compression techniques.

According to the present invention, the sweep format of a common display is altered so as to accommodate video from a variety of sources of different video formats. In accordance with the invention, all video storage is accommodated in series shift registers.

According further to the present invention, timing and sweep control signals are provided to selectively operate a display in response to radar video of various types as well as TV video of various types, and to control a slaved TV video source if desired, or to be controlled by a master TV video source.

In further accord with the invention, sparse video is interleaved with video generated as the average of adjacent lines of video to provide a display with greater video density and less flicker.

The present invention eliminates the need for any random access memories, requiring only the usage of a serial memory, such as shift registers, for video storage. The invention permits refreshing a video display at TV rates in response to much slower radar video signals, the accommodation of any TV source, and the control of special TV sources for utilization therewith.

The present invention permits utilization of data compression inasmuch as all data is fed to the display in the same order in which the data is received from the video source. This greatly reduces the amount of storage which is required, which when coupled with the utilization of serial shift registers without any need for random access addressing and the like, highly simplifies the accommodation of a variety of sources on a single display.

By converting the scan of the display rather than the format of the data, the present invention provides high versatility with low cost, size and weight in a multi-source scan converter display system.

Because the present invention allows each video source to be displayed in its own natural format, the display resolution is not limited to being less than the inherent resolution of the video source, and there is additional flexibility in the choice of display resolution (which is governed only by inherent video source resolution, sampling rate, memory cycling rate and sweeps). For instance, radar video converted to TV raster format is limited in range resolution to the number of TV lines (483 in a standard TV display) whereas the disclosed format can display upwards of 2000 range elements and is limited only by the inherent sensor range resolution.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is an illustration of a depressed center PPI radar display;

FIG. 2 is an illustration of a typical TV display raster;

FIG. 3 is an illustration of a skewed B-scan display of a mapping radar;

FIG. 4 is a schematic block diagram of a scan converter system in accordance with the present invention;

FIG. 6 is a schematic block diagram of timing generator circuitry for use in the embodiment of FIG. 4;

FIG. 8 is a schematic diagram of synthetic resolution doubling circuitry which may be used with the embodiment of FIG. 4.

DESCRIPTION OF THE PREFERRED EMBODIMENT

Referring now to FIG. 1, the well known depressed center PPI display typically utilized in an air-to-air radar commences at the lower center and advances radially outward therefrom in synchronism with each transmitted pulse, the angle, $\theta$, of the sweep corresponding with the angle $\theta$ of the scanning radar antenna. Each incremental distance along the radial scans represents a given range bin, which is related to the pulse-width of the radar, as is well known. In contrast, the well known interlaced TV raster is illustrated briefly in FIG. 2. In the TV raster all scans are horizontal, the vertical scan causing the successive horizontal lines to be lower and lower on the face of the tube. It is obvious that this type of scan is quite different from that illustrated in FIG. 1. Heretofore, the use of a scan converter required that the radar video be acquired and stored in the same order as it is generated by the radar (as illustrated in FIG. 1), and then be converted into X, Y coordinates for display in the TV raster (as illustrated in FIG. 2). This is done, rather than converting the television video to a radar type display since only the TV format covers the entire CRT display area. Another type of radar display is illustrated in FIG. 3. This type of display may be utilized in a high resolution ground mapping radar of the coherent pulse doppler synthetic aperture signal processing type. In this type of radar, as the aircraft flies along with its antenna squined at an angle $\phi$ with respect to its flight path, the successive return signals are integrated over the length of the aperture, and through processing simulate the same effect as would be achieved by utilizing a very large antenna having an aperture of the same length as the flight aperture. This requires a skewed B-scan type of display as shown in FIG. 3, in which each of the lines travels to the right and up from the left margin (in the case shown in FIG. 3) and is equivalent to one of the radial lines in the depressed center PPI display of FIG. 1. As the plane flies along, the video changes one line at a time, so that a new line of video is added and an old line of video drops off, the remaining video being available in storage to continuously rebuild the display utilizing the current video plus some number of old lines of video, thereby presenting a map that advances in caterpillar fashion.

It is quite apparent that these displays vary quite significantly from each other; other common displays are the normal B-scan display (similar to FIG. 3 but orthogonal), plan position indicator displays in which a full azimuth scan is represented by radial lines (similar to FIG. 1), and others which vary by differing amounts from each other.

Figure 5:
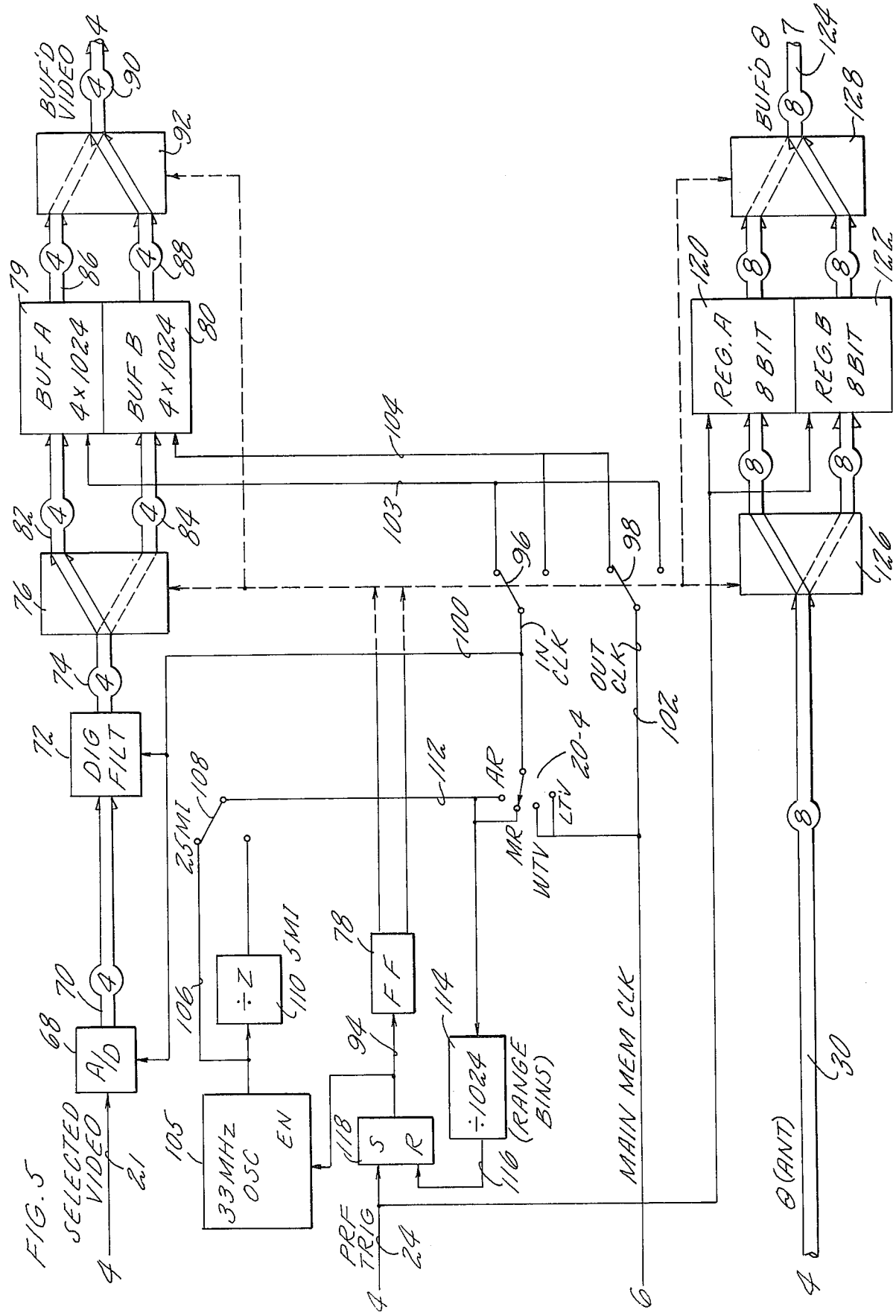
FIG. 5 is a schematic block diagram of input buffer and A/D conversion circuitry for use in the embodiment of FIG. 4.
Figure 7:
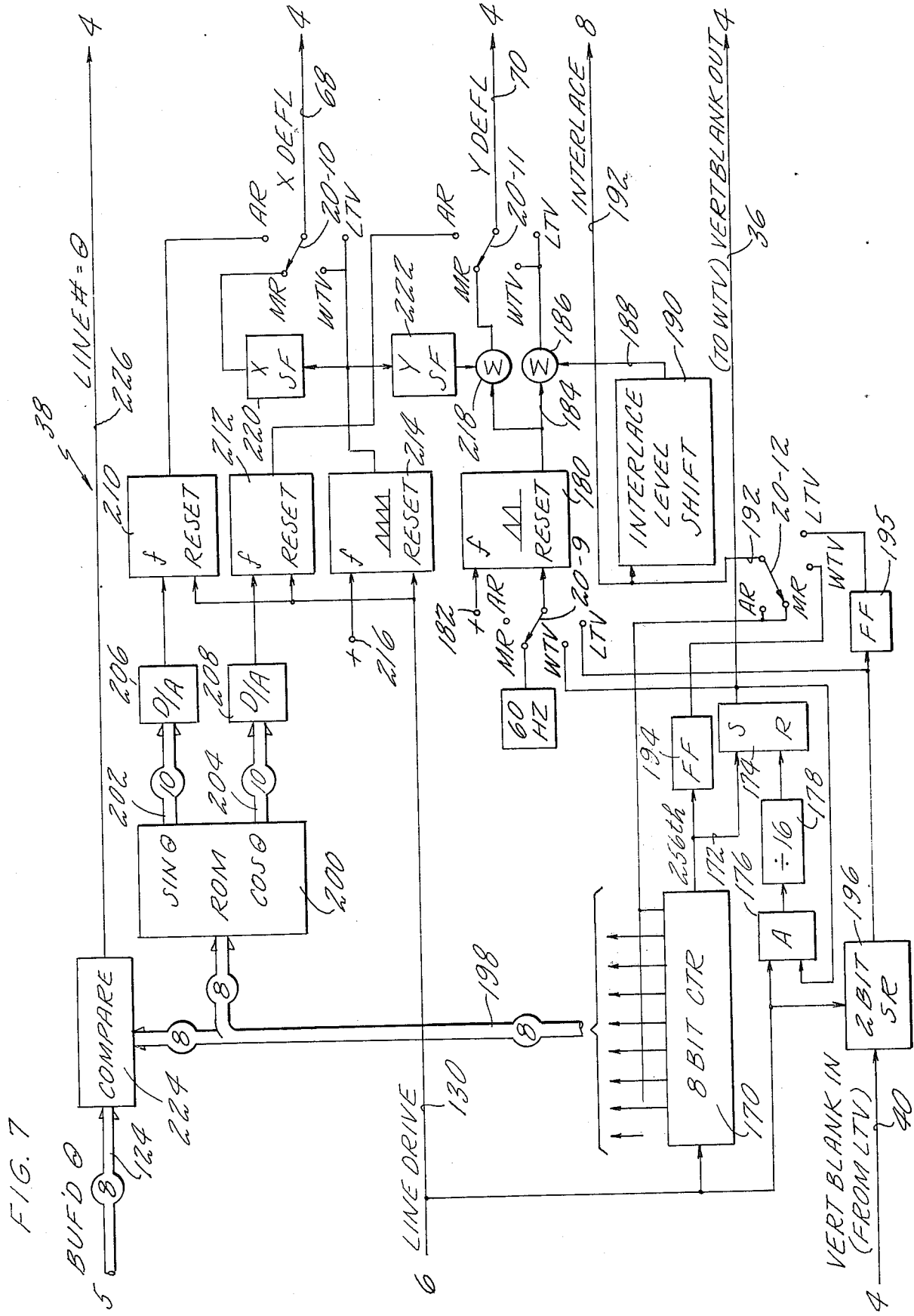
FIG. 7 is a schematic block diagram of sweep generation circuitry for use in the embodiment of FIG. 4.

The system of the present invention will accommodate video sources having diverse display formats, and the embodiment herein accommodates the formats illustrated in FIGS. 1–3. An exemplary system in accordance with the present invention is illustrated in FIG. 4; details of the buffer, the timing, and the sweep are illustrated in FIGS. 5–7. A plurality of data sources include: an air-to-ground radar 10 which utilizes a display of the type illustrated in FIG. 1, and which is selected by switch contacts referred to as AR hereinafter; a mapping radar 11 which utilizes a display of the type illustrated in FIG. 3 and which is selected by switch contacts referred to hereinafter as MR; a weapon television 12 which utilizes an interlaced TV raster display of the type illustrated in FIG. 2 and which is selected by switch contacts referred to hereinafter as WTV, the weapon TV 12 being controlled by timing signals generated in the display system of the present invention; and a landing television 13 which also utilizes a raster type display as illustrated in FIG. 2, but which provides its own timing signals that are utilized by the display system herein for controlling the display when this system is selected, the landing TV being selected by switch contacts referred to hereinafter by LTV. Each of the sources 10–13 has a corresponding video output line 14–17, one of which is selected by a first pole 21-1 of an eleven-pole, four-throw video source selection switch 20, to provide a selected video signal on a line 21 to an input buffer 22 described with respect to FIG. 5 hereinafter. A second pole 20-2 provides a PRF synchronizing signal on a line 24 from either of two lines 26, 28 which correspond respectively to the air-to-ground radar 10 and the mapping radar 11, each of which provides a timing signal related to the pulse repetition frequency of the related radar, which relates to the time of firing of the main transmitted pulse of the respective radar. In addition, the air-to-ground radar 10 provides a digital indication over a trunk of eight lines 30 of the angle $\theta$ of the antenna of the air-to-air radar, as the antenna is scanned. The digital signals on the lines 30 may be generated, typically, by a digital shaft angle encoder of any well known type. Alternatively, an analog signal may be provided in lieu of the digital signal, with suitable, apparent modifications in the manner of utilization thereof, as is more apparent hereinafter.

The weapon TV 12 is timed by a horizontal synchronizing signal provided on a line 32 by timing generator circuitry 34 which is described with respect to FIG. 6 hereinafter, and by a vertical blanking signal on a line 36 which is provided by sweep generation circuitry 38 described with respect to FIG. 7 hereinafter. The weapon TV 12 may comprise a scanned, TV-type infrared camera utilized for optical tracking of a weapon, such as a missile, and may be of the type commonly referred to as an FLIR (forward looking infrared) system, or it may be some other sort of TV system. For illustrative purposes herein, it is assumed that the landing TV 13 is a TV camera of the type utilized in general broadcasting, which provides its own timing signals, including a vertical blank signal provided on a line 40 to the sweep generator 38 and a horizontal synch signal provided on a line 42 to the timing generator 44. The significance of the differences between the two systems is simply exemplary, in order to illustrate herein the manner in which the present invention may be adapted to accommodate different types of video sources. Naturally, other types of TVs may be utilized as sources in accordance with the principals of the present invention, and there is no particular significance to the fact that it is assumed herein that the weapon TV is synchronized by the display system of the present invention whereas the landing TV is self-synchronized and provides signals to synchronize the system of the present invention.

The basic data flow for the video in the system is from the selected video signal line 21 to a display 44 which may be of any suitable, well-known type of cathode ray tube display having X and Y deflection circuitry, focusing, and video circuits. The video signal on the selected video line 21 is an analog signal, as is the input to the display 44 on a line 46. However, the remainder of the system (except for the sweep circuits) is primarily digital. Therefore, the video signal on the line 21 is converted to a digital signal prior to buffering in the input buffer 22. The buffer provides four digital data bits, representing sixteen gray shades (video brightness) on a trunk of four lines 48 to a data compression encoder 50 which may be of the type illustrated and described in a commonly owned copending application Ser. No. 323,155, filed on Jan. 12, 1973 by G. C. Waehner, now U.S. Pat. No. 3,784,737. This system utilizes a combination of coarse/fine encoding and delta modulation encoding to convert 4 digital data bits, which are representative of sixteen gray shades of video, to 2 digital data bits which can be reconstructed, in a data compression decode circut 52, to 4 digital bits on a trunk of lines 54 representative of the 16 gray shades of data. These four bits are converted in a digital to analog converter 56 to provide the analog display video input signal on the line 46. The 2 bit output of the data compression encode circuit 50 is applied on a trunk of two lines 58 to a digital selection gate 60, the output of which is applied over a trunk of two lines 62 to a main memory 64 which stores the successive lines of video for later, repetitive read-out and application over a trunk of two lines 66 to the data compression decode circuit 52. The switch 60 (and other related switches referred to hereinafter) may simply comprise transistor AND circuits which are selectively operated by corresponding input signals, or may comprise a well-known multi-plexer chip. The serial memory 64 preferably comprises well known shift registers, which may be implemented with FETs, charge transfer devices and the like; or it may be a sequentially addressed random access memory if desired, although such would be unnecessarily bulky and expensive.

One of the primary advantages of the present invention is that the display 44, operating in response to X and Y deflection signals on a pair of lines 68, 70 from the sweep generator 38 (as is described more fully hereinafter) can display data in different formats, so that the video data provided by the input buffer 22 can be in the same format as the video data provided to the digital analog converter 56, and need not be converted to different formats as is true of scan converters known to the prior art, which typically convert radar video format into a TV format for presentation on a common display. Since the data is in the same serial order when displayed as it is when received, it does not require utilization of a random access memory, but simply a long serial memory (perhaps 262,000 2-bit words) which may comprise a plurality of shift registers formulated from bipolar or MOS transistors, or may more simply comprise a bubble memory, or the recently developed charge transfer type of memory. In any event, it should be quite apparent that the serial memory is simpler and lower in cost than a random access memory, and is capable of being utilized herein because of the fact that the serial order of data remains the same for display as when received, for all of the diverse data sources. This factor also permits utilization of significant data compression, which in the present instance and in accordance with the aforementioned copending application, provides a 2:1 reduction in the amount of required storage, with no significant degradation of the displayed video. In cases where the order of the data needs to be altered so as to convert, for instance, from Rho, Theta radar format (FIG. 1) to X, Y TV format (FIG. 2), it is difficult to provide any meaningful data compression since the data is in a different order as displayed than when received.

Referring now to FIG. 5, the input buffer 22 converts the analog selected video signal on the line 21 to digital signals in an analog to digital converter 68 which may be of any suitable conventional type. This typically provides a four-bit digital signal on a trunk of lines 70 which represents sixteen grey shades of video to a digital filter 72 which can be of any conventional type to provide improvement in video signal to noise ratio by the averaging of signals from successive Theta (azimuth) resolution elements. On the other hand, the present invention certainly may be practiced without utilization of the digital filter 72, if desired. The output of the digital filter 72 on a trunk of four lines 74 is applied to an electronic gating switch 76, which is one of several switches controlled by a flip flop 78, to steer the data on the line 74 to either one of two buffer storages 79, 80 over related input lines 82, 84. The output of the buffer storages 79, 80 are similarly transferred over related output lines 86, 88 to a trunk of four buffered video lines 90 by means of a similar electronic gating switch 92. Switch 92 is also operated by the flip flop 78 in a well known fashion. The buffers 79, 80 are required in order to permit the present system to receive data at a rate which is different than the rate in which the main memory 64 must operate in providing the stored data to the display 48. In the present system, the main memory 64 operates at a rate which is commensurate with on the order of 500 units of resolution across each horizontal scan of a television raster, and may be on the order of 10 MHz, whereas data received from radar systems can be three times as fast and may be on the order of 33 MHz. Since the flip flop 78 is toggled by a signal on a line 94 once for each of the PRF trigger signals on the line 24, a first line of radar data (see FIGS. 1 and 3) is put in one of the buffers while the second buffer is being read out to the remainder of the system (FIG. 4), and then the next line of data is put in the second buffer while the data in the first buffer is read out to the system, in a conventional fashion. The buffers 79, 80 simply comprise serial shift registers, which may be of any type as described hereinbefore. The signals for advancing the shift registers are different when being loaded with radar video than when being loaded with TV video or when being unloaded (memory data rate). This is accomplished by means of a pair of switches 96, 98 which steers input clock signals from a line 100 to either of the two buffers on lines 103, 104, alternatively, and steers output clock signals on a line 102 to the opposite of the two buffers. The input clock signals differ for radar and TV, so each of the buffers is caused to advance at a clock rate commensurate with the rate at which radar video is received when being loaded with radar video and is clocked at a rate commensurate with the rate at which TV video is received when being loaded with TV video, but in either case are advanced at a rate commensurate with the rate of displaying data (and therefore) of loading the circulating main memory 64) when being unloaded. The switches 96, 98 may simply comprise conventional transistor switches which are activated by corresponding outputs of the flip flop 78 in synchronism with the operation of the gating switches 76, 92 (hereinbefore). The input clock signals on the line 100 are selected by a fourth pole 20-4 of the video source selection switch either from the main memory clock signal on the line 102 (which is also used as the output clock for the buffers) or from a 33 MHz, selectively-enabled oscillator 105. The oscillator output on a line 106 may either be supplied directly through a 2.5 mile contact of a range selection switch 108, or at half frequency through a 5 mile contact of the range selection switch 108 due to the operation of a divide by 2 circuit 110. This permits accommodating high video rates of short range modes of radar operation or the lower video rates of long range radar operation modes, and may of course include other frequency division for other selectable ranges, all as is well known in the art. The selected radar input clock signal on the line 112 is applied to the AR and MR contacts of the switch 20-4 and also to a 1024 detector or divider 114 which provides an output signal on a line 116 for resetting of a bistable device 118 at the end of the active portion of each sweep, when the maximum range has been reached (which is assumed to be 1024 range bins in this case). Thus as each pulse is transmitted by the radar, the bistable 118 becomes set, which applies a signal on the line 94 to reverse the state of the flip flop 78 and thereby exchange roles of the buffers 79, 80 and also applies the signal to the enabling input of the gated oscillator 104 so as to begin to clock the data into the selected buffer. Once the maximum range bin has been reached for that transmitted pulse, the counter 114 will cause resetting of the bistable 118 thereby removing the enable signal so that the oscillator 104 no longer provides clocking signals to the buffer. The input clock on the line 100 is also used to synchronize the A/D converter 68 and the digital filter (if used).

Illustrated at the bottom of FIG. 5 is a pair of buffer registers 120, 122 which are utilized to buffer the digital data on the trunk of eight lines 30 which relate to the scan angle $\theta$ of the antenna of the air-to-ground radar 10. Since this is simply a single parallel word for each transmitted pulse, the registers 120, 122 do not require any clocking signals, except a signal such as the PRF trigger signal on the line 24, to gate the fresh data into the buffer once for each transmitted pulse. The registers 120, 122 are alternately switched between a trunk of lines 30 and a trunk of eight buffered $\theta$ lines 124 by a pair of digital gating switches 126, 128 which are similar to the switches 76, 92 and are operated in synchronism therewith by the flip flop 78.

Although the input buffer 22 provides buffering of video input in the case of reception of radar video, it should be apparent that, since the flip flop 78 is not altered in any fashion except in response to the PRF trigger signal 24 (which will not be applied to the bistable 118 whenever the video source selection switch 20 is in other than a radar position), the input buffer 22 will simply provide A to D conversion without buffering to video signals received from either of the TV sources 12, 13. In fact, if desired, the output of the A to D converter 68 (or to the output of the digital filter 72) could be switched directly to the buffered video lines 90 by the provision of an additional switch operable in response to another pole of the video source selection switch 20 so as to bypass the buffers 79, 80, if desired. In the event that the circuitry remains as shown in FIG. 5, so that landing television video is passed through one of the buffers, certain accommodation of the time delay inherent therein is provided to account for essentially a two-line delay, as described hereinafter.

Referring now to FIG. 6, the timing generator 34 provides a line drive signal on a line 130, which is utilized to generate sweep signals described more fully with respect to FIG. 7 hereinafter, and to gate the main memory clock signal to a line 132 through an AND circuit 134. These signals are generated either in response to signals derived from a 10 MHz oscillator 136 whenever one of the radars or the weapon TV 12 has been selected, or in response to the horizontal sync input signal on the line 42 when the landing TV 13 has been selected as the video source, in dependence upon the setting of three poles 20-5, 20-6 and 20-6b of the video source selection switch 20. That is, in the case of the landing TV 13, this system is controlled by synchronizing signals from the TV 13 so that each of its horizontal synch signals on the line 42 provides a line drive signal on a line 130, gates the main memory clock during the line drive period, and also synchronizes the generation of main memory clock signals in a phase locked loop 138. In other cases, the timing signals are generated in response to the 10 MHz oscillator 136. In the case of the radar sources 10, 11, it is assumed that there are 1024 range bins in each transmitted pulse, so that a 1024 count-down (or divider) 140 provides, through suitable contacts of a pole 20-7 of the video source selection switch 20, a signal on a line 142 which sets a bistable device 144 indicating completion of a line of video (radial in the case of the air-to-air radar, as seen in FIG. 1, and diagonal in the case of the mapping radar, as seen in FIG. 3). The set output of the bistable 144 provides the horizontal synch output signal on the line 32 to the weapon TV 12. The bistable 144 is reset by a signal on a line 146 which is provided in the case of radar through the contacts of a pole 20-8 of the video source selection switch 20 from a divide-by-128 circuit 147 which counts clock pulses of the 10 MHz oscillator 136 on a line 148 during the display blank time, which is typically about an eighth of a cycle and is commensurate with the presence of the horizontal synch signal on the line 32. The counter 147 responds to a signal on a line 150 which comprises clock signals on the line 148 gated through an AND circuit 152 by the set side of the bistable 144, which defines other than line drive time. Thus, the bistable 144 becomes set at the end of a line of data, and is again reset at the end of blank time. In the case where the weapon TV 12 is the selected source, the switch 20-8 selects a signal from a line 154 which is the next to last stage output of the 128-divider 147, and similarly the switch 20-7 selects a signal on a line 156 which is the next to last stage of the 1024 counter 140, thereby providing for horizontal lines of TV data with 512 data resolution elements per line, and a horizontal retrace period which is 64 clock pulses long. In the case where the landing TV 13 is the selected source, the horizontal synch input signal on the line 42 is selected directly by the switch 20-5 so that the output of the oscillator 136 is not utilized in any fashion.

The main memory clock signal on the line 132 is passed through a switch 20-6b from the AND circuit 134 and through the switch 20-6a. In the case where the selected video source is either of the radars 10, 11 or the weapon TV 12, the 10 MHz clock signal on the line 148 is applied to the AND circuit 134. However, in the case where the landing TV 13 is the selected source, the main memory clock signals are provided by the switch 20-6b from a line 160 in response to a voltage controlled oscillator 162, which, together with a 17-bit counter (which divides by 131,072) and a synchronous demodulator 166, comprises a phase locked loop 138. The phase locked loop operates in a well known fashion to synchronize signals at 7.87 MHz in the VCO 162 with signals which are at 131,072th of the frequency thereof, comprising the 60 Hz vertical synch signals on the line 40 from the landing TV 13. The 7.87 MHz rate for the main memory clock provides for one full circulation of the main memory per TV frame, which results in less than the full utilization of the memory, but accommodates a scanning rate of approximately 444 resolution elements per line, and 483 lines per frame.

Referring now to FIG. 7, the line drive signal derived from the timing generator on the line 130 defines the time during which a line of data is being presented on the display 44 (FIG. 4). This signal is applied to an eight bit binary counter 170 which includes a plurality of bistable stages, the output of each being connected to an AND circuit (now shown; within the counter 170) together with a signal comprising the summation of AND circuit outputs from all preceding stages, to provide a signal on a line 172 which indicates when all of the stages are set to ONE and therefore that the 256th line is being scanned. The 256th output of the counter 170 on the line 172 is used to set a bistable device 174 which indicates, when set, the vertical blanking period during which the sweep must retrace from the lower left corner to the upper right corner in the case of a TV picture. The bistable 174 enables an AND circuit 176 which passes line drive signals to a 16-bit counter 178; when the count is complete, the bistable 174 is reset by the counter 178, thus terminating the weapon TV vertical blank period. The bistable 174 also provides on the line 36 the vertical blanking output signal to the weapon TV 12. When the weapon TV is selected, a ninth pole 20-9 of the video source selection switch 20 causes the signal on the line 36 to be applied to the reset input of an integrating amplifier 180 which is also provided with a constant DC input from a voltage source 182, the polarity being such that the output of the integrating amplifier 180 is reset to zero at the end of the vertical blank signal on the line 36. This causes a vertical sawtooth voltage to be generated suitable for Y deflection of the normal TV raster. The output of the integrating amplifier 180 is applied over a line 184 to a summation circuit 186 which also receives an input on a line 188 from an interlace level shift circuit 190 which provides a slight DC shift in the level of the sawtooth voltages in the case of the 257th–512th lines being generated, in contrast with the output thereof in the case where the 1st through 256th lines are being generated, so as to lower each horizontal trace by one-half line, thereby to provide an interlaced raster pattern of the type illustrated in FIG. 2. The interlace level shift is activated by a signal on a line 192 from a 12th pole 20-12 of the source selection switch; when switched to the weapon TV, this is in response to a flip flop 194 which is reversed by alternate signals on the line 172 when the 256th line is sensed; for the landing TV, it is in response to alternate LTV vertical blanks due to a flip flop 195; and is responsive to the high bit of the counter 170 when the radars are selected. The vertical blank input signal on the line 40, generated by the landing TV 13 (FIG. 4), is delayed for two horizontal lines in a 2-bit shift register 196 (FIG. 7) to accommodate the two line delay inherent in the 1024-bit shift register buffers 79, 80 (FIG. 5); the shift register 196 is clocked by the line drive signal on line 130.

The output of the counter 170 represents lines of the sweep, which relate to radar scan angles ($\theta$). With the high order bit moved into the least significant bit position to accommodate interlacing, the output of the counter 170 applied on a trunk of eight lines 198 to a read only memory 200 which has two outputs for each input, one comprising the sine of $\theta$ and the other comprising the cosine of $\theta$, which are in digital form and applied over respective trunks of ten lines 202, 204 to related D to A converters 206, 208, the outputs of which are applied to integrators 210, 212 which are reset by the start of the line drive signal on the line 130. Alternatively, the digital signals on line 198 may be converted to analog, and standard analog sine and cosine generators may be used. As is known, the sweeps for the depressed center PPI display of the type illustrated in FIG. 1 utilized with an air-to-ground radar, requires an X deflection signal which is the integral of sine $\theta$ and Y deflection signal which is the integral of cosine $\theta$. The outputs of the integrators 210, 212 are applied through tenth and eleventh poles 20-10, 20-11 of the video source selection switch 20 to the X and Y deflection lines 68, 70 respectively. The X deflection is provided for the two TV sources 12, 13 by means of an integrating amplifier 214 which integrates a constant voltage from a source 216 in a well known fashion so as to provide a horizontal sawtooth sweep. In the case of the mapping radar, the X deflection and the Y deflection are both provided by the integrating amplifier 214, but the Y deflection is generated by a summing network 218 which utilizes the output of the Y integrating amplifier 180, reset by a 60 Hz source 219 through switch 20-9, in order to cause the scan to advance from the top to the bottom, as illustrated in FIG. 3. In the case where the mapping radar has its antenna set at a squint angle $\phi$ of 45°, the X and Y deflection components (except for that part of the Y component which causes the stroke lines to advance from top to bottom) will be equal. In other cases, the X and Y deflection voltages must be altered somewhat to reflect the angle $\phi$, which may be achieved in suitable scale factor circuits 220, 222, which may comprise variable gain amplifiers, all as is well known in the art. The scale factor is adjusted for a given squint angle, $\phi$, for a given weapon radar, or it may of course be made adjustable so as to accommodate variations in the squint angle. Of course, other forms of accommodations may be made for differing squint angles in dependence upon the need to maintain a constant size of the display presentation and other factors, all of which is within the skill of the art.

The output of the counter 170, with the high order bit transposed into the lowest ordered position is also applied on the trunk of eight lines 198 to a compare circuit 224 for comparison with the buffered $\theta$ signal on the lines 124. When the setting of the counter equals the buffered value of the radar antenna scan angle $\theta$, the compare circuit 224 will generate a line number equals $\theta$ signal on a line 226, which is utilized in FIG. 4 to gate an AND circuit 228 that is also operated by a signal on a line 230 indicating that the data is not to be frozen (that is, all the old data is not to be retained, but new data is to be entered). When the switch 20-3 selects the air-to-ground radar, it provides the signal from the AND circuit 230 onto a line 232 to cause the electronic switch 60 to transfer from the position shown (in which the output of the main memory 64 is recirculated back into itself) to the dotted position (in which new data is entered from the 2 bit bus 58). In other words, except in a freeze mode (described hereinafter) when the counter 170 (FIG. 7) has the same setting as the value of the antenna scan angle, new data from the air-to-air radar is entered into memory. Since it is entered (with its high ordered bit transposed to the low order position), the video actually stored in memory in an interleaved fashion so as to permit interlaced display in such a fashion that only the odd lines are displayed in a first field and the even lines being displayed in the second field of each frame, as is true in the case of an interlaced TV raster, as illustrated in FIG. 2. This reduces the amount of flicker visible to the eye at a 60 Hz display rate. When the air-to-ground radar is the selected source, the video provided by the radar can be frozen at any time so as to continuously display the same video (rather than updating the display with new video from the radar), by moving a switch 236 from the position shown in FIG. 4 to the FREEZE position. This removes the voltage from a source 238 from the line 230, thereby blocking the AND circuit 228 so that the electronic switch 60 will remain in the position shown, in which the main memory is simply recirculated without any new video data being entered therein. This allows studying of a particular field of view while it is frozen into a static condition.

In the case where mapping radar has been selected by the video source selection switch 20, the pole 20-3 provides the PRF synch signal on the line 24 to the line 232 so that new data is caused to be entered into the main memory once for each transmitted pulse. Thus for each new scan of radar data, the map moves down one line in a caterpillar fashion. In order for the lines or video in the mapping radar display (FIG. 3) to advance downward for each transmitted pulse of the mapping radar, it is necessary to advance the sweep with respect to the presentation of data, or more particularly to delay the data output of the main memory with respect to the sweep. Returning to FIG. 6, the main memory clock signals applied to the AND circuit 134 are derived through an AND circuit 250 for passage through the mapping radar contact of the switch 20-6. This AND circuit operates only when a bistable 252 is reset. The bistable 252 is placed in the set state (thereby blocking the AND circuit 250) on the first occurrence of a line drive signal on the line 130 concurrently with the PRF synch signal on the line 24, provided there is a signal input to an AND circuit 257 on a line 254 from the reset side of a bistable device 256. This will be present upon the occurrence of the first line drive signal on the line 130 concurrently with the PRF synch signal on the line 24. Once the bistable 252 becomes set, it sets the bistable 256 so that the signal on the line 254 disappears, and cannot reappear until an inverter 260 senses the absence of the PRF synch signal on the line 24. However, after the bistable 252 has become set, a subsequent line drive signal on the line 130 will cause an AND circuit 262 to reset the bistable 252. The bistable 252 cannot then again be set until the bistable 256 is again reset at the end of the PRF synch signal. Thus, the AND circuit 250 causes the main memory clock to lose one line scan for each transmitter pulse of the mapping radar. This in turn causes the video data to be presented one line lower in the display following each transmitted pulse, and the video data displayed is updated by one line as described with respect to FIG. 4 hereinbefore.

The versatility of the present invention has been demonstrated with respect to two different types of radar video sources and two different types of TV sources. In some cases, notably radar, it may well be that a source has insufficient resolution to warrant storing 512 lines of data in any display frame. If desired, the present system can also accommodate the utilization of additional apparatus to provide interpolation between display lines of relatively sparse video to produce a 512 line frame with only 256 lines of data. This system provides a reasonably accurate and pleasing display by interpolating between the actual lines of video so as to intersperse with them lines in which the video brightness of the individual resolution elements is the average of the actual video on the preceeding and succeeding display lines. This is achieved in the circuitry of FIG. 8 by adding the video intensity level of each resolvable element in each line of video with the corresponding intensity level of the next preceeding line of video, and dividing by two so as to provide lines of video in which the intensity is the average of the preceeding line and a succeeding line. This is accomplished by providing, between the data compression decode circuit 52 and the digital to analog converter 56, another electronic switch, or multiplexer, 270 which alternatively provides four bits of video on a trunk of lines 54b in response to the normal video provided on the trunk of lines 54a, or in response to averaged video on a trunk of lines 54c. The average video is provided as the 4 high order bit outputs of an adder 272 which has the regular video at one input and has video at the other input on a trunk of four lines 274 from a 1024 bit shift register 276, which is shifted by clock signals on the line 132. As one field of data is being provided on the line 54a, it is fed through the switch 270 (in the position as shown) so as to be displayed. During the next field time, the same video data is being provided by the memory, both to the adder and to the shift register. After one line time, memory data is added to data which is now emerging from the shift register 276; as a result of a subsequent interlace signal on the line 192, the switch 270 transfers so that the output of the adder is continuously provided for display. Then the next field will be provided directly from the data compression decode circuit 52 as a result of the switch 270 returning to the position shown in FIG. 8, and so forth. Thus each field of regular video is interlaced with a field representing the average video intensity so as to smooth up the picture without distorting it from a true representation. Other variations may be provided: for instance, with only 128 lines of video, each fourth line could be regular video, the middle line therebetween could be the average thereof, and the first and third lines could be the average of the middle with the preceding and succeeding lines. The shift register 276 may have a switch 278 to alter its operation to accommodate lines of video having only 512 resolution elements.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A scan converter display system adapted for utilization with a plurality of video sources, comprising:
   means settable for designating a selected one of a plurality of video sources;
   timing generator means for providing display and source control timing signals, said timing generator means including a portion of said video source selecting means for providing different timing signals in response to the selection of different sources;
   serial, digital memory means responsive to said timing generator means for storing signals;

input means including a portion of said video source selecting means and responsive to said timing generator means for providing to said serial memory signals relating to the video input of a selected one of the video sources;

a signal CRT display means having beam deflection and video intensity control means;

sweep generating means responsive to said timing generator means for providing at least a pair of sweep defining beam deflection signals to said display means, said sweep generating means including a plurality of different sweep generation circuits for each beam deflection control input signal required by said display means; said sweep generating means including a portion of said video source selection means for providing different sweeps to said display means in dependence upon the nature of the selected one of the video sources;

and means responsive to said timing generator means for providing video signals to said display means in response to signals from said memory means.

2. The display system according to claim 1 additionally comprising:

memory input selection means interposed between said input means and the input of said memory means and including a portion of said video source selection means for alternatively causing the input of said memory means to be derived from the output thereof, thereby to recirculate the signals therein, or to be derived from said input means signals, thereto to update the video content of the signals stored in said memory means.

3. The display system according to claim 1 wherein said input means includes a data compression encode circuit and wherein said means providing video signals to said display means includes a data compression decode circuit operated in conjunction with said data compression encode circuit, thereby to provide data to said memory means in compressed fashion.

4. The display system according to claim 1 wherein said means providing signals to said display means includes a serial storage means for storing signals from said memory means and means responsive to said memory means and to said serial storage means for providing signals representing video intensity which is the average of the video intensity represented by signals from said memory means and signals from said storage means.

5. The display system according to claim 1 wherein said input means comprises input buffer storage means and a portion of said video source selection means and clock means responsive thereto for selectively operating said input buffer storage means at different video input rates commensurate with the selected one of the video sources.

6. The display system according to claim 1 adapted for use with a radar video source and a TV video source wherein said sweep generating means includes means to provide TV raster beam deflection signals or radar-format beam deflection signals in dependence upon the setting of said video source selection means.

7. The display system according to claim 6 including means providing horizontal synch and video blank signals for use by said TV source.

8. The display system according to claim 6 adapted for use with a complete TV video source that provides horizontal synch and vertical blank signals, and wherein said timing generator means includes means synchronized with said vertical blank signals for providing clocking signals to said memory means and sweep generation circuits are responsive to said horizontal synch and vertical blank signals for providing said TV raster beam deflection signals when said complete TV video source is selected by said video source selection means.

* * * * *

UNITED STATES PATENT OFFICE
CERTIFICATE OF CORRECTION

PATENT NO. : 3,904,817
DATED : September 9, 1975
INVENTOR(S) : HARVEY F. HOFFMAN It is certified that error appears in the above-identified patent and that said Letters Patent are hereby corrected as shown below:

Column 5, line 1, change "circut" to --circuit--

Column 6, line 46, after "therefore" delete ")"

Column 7, line 62, change "sync" to --synch--

Column 8, line 12, change "bis-" to --bi- --

Column 8, line 13, change "table" to --stable--

Column 13, claim 1, line 4, "input" should be --output--

Column 13, claim 2, line 31, "thereto" should be --thereby--

Signed and Sealed this twenty-third Day of December 1975

[SEAL]

Attest:

RUTH C. MASON
Attesting Officer

C. MARSHALL DANN
Commissioner of Patents and Trademarks